Jan. 7, 1969   W. KOBNICK   3,420,256
REDUCING VALVE FOR FRONT AXLE BRAKE CYLINDERS
Filed Jan. 16, 1967
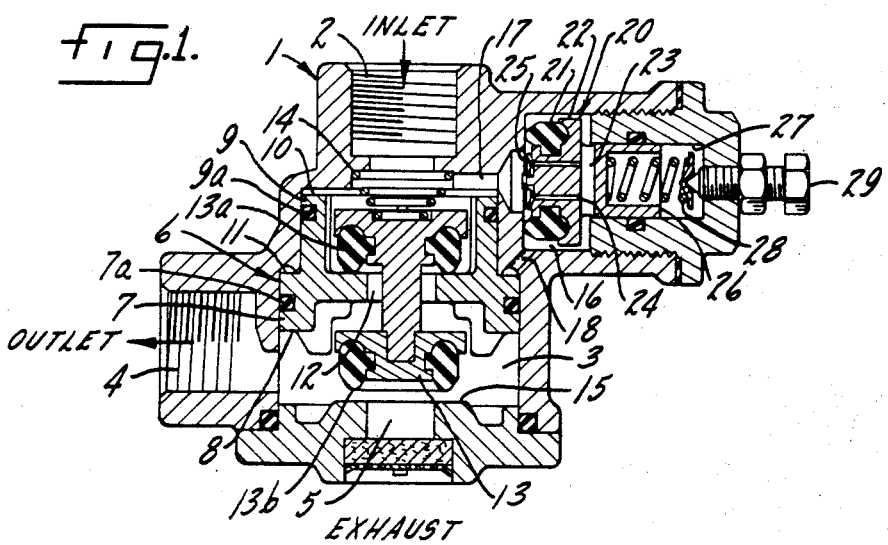
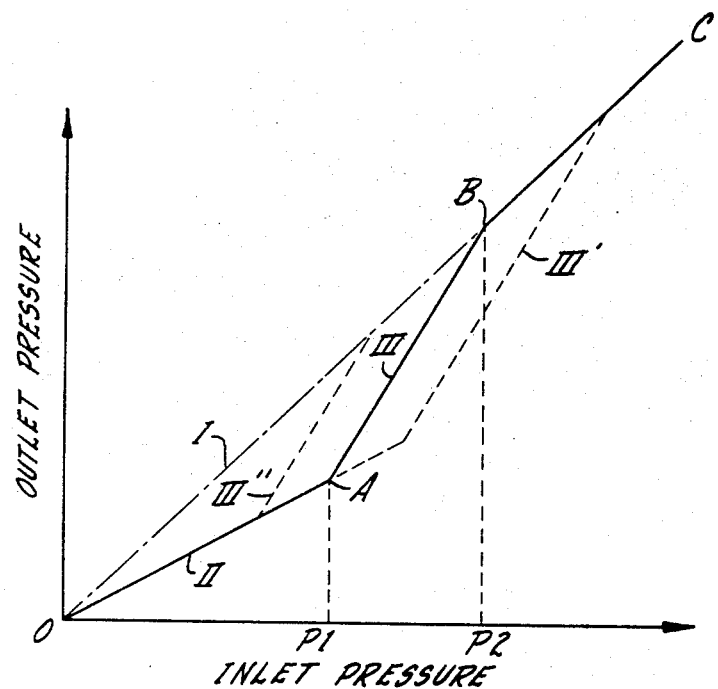
INVENTOR.
Werner Kobnick,
BY Parker & Carter
Attorneys.

United States Patent Office 3,420,256
Patented Jan. 7, 1969

3,420,256
REDUCING VALVE FOR FRONT AXLE
BRAKE CYLINDERS
Werner Kobnick, Heidelberg, Germany, assignor to Berg
Mfg. & Sales Co., a corporation of Illinois
Filed Jan. 16, 1967, Ser. No. 609,663
Claims priority, application Germany, Feb. 21, 1966,
B 85,891
U.S. Cl. 137—102       6 Claims
Int. Cl. G05d 11/03

ABSTRACT OF THE DISCLOSURE

A valve assembly including a first differential piston carrying a valve element and having a smaller surface exposed to inlet pressure and a larger surface exposed to outlet pressure and a second differential piston controlling communication between the inlet and a third surface of the first differential piston. Inlet pressure below a first predetermined level is reduced at the outlet by the first piston. As inlet pressure rises above the first predetermined level it is reduced a gradually lessening amount by the action of the second piston until a second predetermined pressure level is reached, after which the second piston remains unseated and the inlet and outlet pressures are equal.

---

This invention releates to vehicle air pressure brake systems and has particular relation to a means automatically varying brake pressures between parts of such a system.

One purpose of the invention is to provide an automatic reducing valve effective to reduce the pressure applied to front axle brake cylinders in response to application of predetermined pressures to the brake system.

Another purpose is to provide an automatic reducing valve effective automatically to supply the same pressure to the front axle brake cylinders and to the remainder of the brake system in response to application of pressure to the system above a predetermined level.

Another purpose is to provide a valve assembly effective automatically to apply a gradually increasing portion of the brake system pressure as said pressure is increased from a first to a second predetermined level and to apply all of said pressure thereafter.

Another purpose is to provide a reducing valve having a differential piston responsive to the delivery of fluid pressure to the valve to automatically reduce the pressure delivered therefrom.

Another purpose is to provide a reducing valve having at least two differential pistons responsive to varying pressures delivered to said valve.

Another purpose is to provide a valve assembly automatically effective to transmit a first ratio of outlet pressure at inlet pressures below a first predetermined level, to transmit an increasing such ratio as said inlet pressure increases toward a second level and to transmit all of said inlet pressure above said second level.

Other purposes will appear from time to time during the course of the specification and claims.

The invention is illustrated more or less diagrammatically in the accompanying drawings, wherein:

FIGURE 1 is a side elevation in cross section; and

FIGURE 2 is a diagram illustrating the action of the device of the invention.

Like parts are indicated by like numerals throughout the specification and drawings.

Referring now to the drawings, the numeral 1 generally designates a valve housing. Indicated at 2 is a fluid pressure inlet communicating with a valve chamber 3. An outlet 4 communicates with another portion of the chamber 3. An exhaust outlet is indicated at 5. Reciprocal within the chamber 3 is a differential piston 6. The piston 6 has a major diameter segment 7 having an end surface 8 presented to the area within chamber 3 below the piston 6 as the parts as shown in the drawings. A reduced extension segment 9 presents a surface 10, of lesser diameter than the surface 8, to the inlet 2, the surface 8 being presented, in effect, to the outlet 4. Intermediate the surfaces 8 and 10 the piston 6 has an annular surface 11 of an area equal to the diameter of segment 7 minus the diameter of segment 9. Seal 7a is carried by piston segment 7 in engagement with the inner wall of chamber 3 and seal 9a is carried by piston segment 9 in engagement with an inner wall surface of lesser diameter in chamber 3. The piston 6 is centrally apertured, to form the passage indicated at 12, and a double-valve member 13 extends therethrough, the member 13 carrying a first valve face 13a engageable with the piston 6 above the passage 12 and urged thereagainst by spring 14. The member 13 also carries, below the piston 6 as the parts are shown in the drawings, a valve face portion 13b engageable with the seat 15 surrounding exhaust outlet 5 to close the latter.

A subchamber 16 is formed in housing 1 and a first branch passage 17 communicates the chamber 16 with inlet 2. A second branch passage 18 communicates the area of chamber 3 above the piston surface 11 with chamber 16 beyond the point of communication therewith of passage 17. A second differential piston 20 is reciprocal in chamber 16 and carries the valve face element 21 in position to close the passage 17 against communication with chamber 16. The piston 20 has a circumferential portion 22 of larger diameter than the effective sealing surface of valve face element 21. A passage 23 communicates the chamber 16, behind the piston portion 22, with passage 18 and, through axially directed passages 24 in piston 22, with the passage 17. A check valve 25 serves to preclude delivery of fluid pressure from passage 17 to passages 24 while permitting delivery of fluid pressure from passages 24 to passage 17. A reduced extension 26 is secured to piston 20 beyond passage 23 and is slidable within a well 27 of housing 1. The well 27 is, it will be understood, evacuated to atmosphere. A spring 28 engages the extension 26 and is adjustable by threaded means 29.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

The valve of the invention is effective to provide automatic reduction of brake pressure applied to the forward vehicle axle in response to relatively light braking by the vehicle operator and is equally effective to apply a gradually increasing portion of the total brake pressure as braking increases and to apply full brake pressure force thereto in response to heavier braking by the operator. At the same time, the situation is avoided in which no forward braking action is provided at lower brake application pressures. Avoided also is a sudden jump in pressures applied to the forward brakes upon application of heavier braking forces by the vehicle operator. Availability of forward braking at relatively low brake forces is of particular advantage when driving on slippery roads and similar situations in which braking action on all vehicle wheels provides a safer condition and a shorter stopping distance.

Braking pressures applied by the operator are delivered to the rear brakes and applied thereto. The same pressures are delivered at inlet 2. When said pressures are below a predetermined level the same are delivered from inlet 2 to the surface 10 of the floating control or weigh piston 6. The piston 6 then moves downwardly, closing exhaust valve element 13b on its seat 15 and thus closing exhaust passage 5 and opening passage 12 for delivery of said inlet pressure to chamber 3 below piston 6 as shown in the drawings. The said pressure thus delivered through passage 12 acts against the larger diameter surface 8 of floating piston 6 to resist its downward movement and thus to limit or reduce the pressure actually delivered through passage 12, chamber 3 and outlet 4 to the forward brake-actuating cylinder.

When the pressure delivered at inlet 2 rises above a predetermined level, the same is sufficient to unseat the valve seal element 21 and to open communication between branch passages 17 and 18 through chamber 16. When seal 21 remains open, inlet pressure is delivered to the surface 11 of floating piston 6. Since the surfaces 10 and 11 of floating piston 6 equal the surface 8 thereof, it will be realized that a balanced condition is then achieved and the inlet pressure delivered at 2 will equal the outlet pressure delivered through outlet 4 to the brake cylinders. Since the pressure delivered at inlet 2 is equal to that delivered to the rear brake cylinders, it will be realized that equal pressure is delivered to both forward and rear brake-actuating cylinders. When desired, the forward and rear brake-actuating cylinders (not shown) may be varied in size in correlation with the pressures delivered to said cylinders.

It will be observed that piston 20 is also a step or differential piston and that pressures delivered through passage 17 to chamber 16 are active against the forward face of piston 20 and that said pressures are also deliverable through passage 23 and thence through passages 24 and check valve 25 to the entrance 2. The differential surfaces of piston member 20 against which pressure delivered through pasage 17 is active produces a variation in the ratios of inlet and outlet pressures as inlet pressures rise and a gradual effect in the delivery of inlet pressures through passages 17 and 18 to the surface 11 which prevents a sudden rise therein. The spring 28 is, of course, adjustable to control the pressure at which piston 20 may be initially moved to open passage 17 and at which piston 20 will remain retracted. Eventually a pressure is reached of sufficient level to hold the piston 20 permanently open against the action of spring 28 and the effect of pressures on the piston 20.

The operation of the valve of FIGURE 1 is illustrated diagrammatically in FIGURE 2, wherein the line I, having an initial portion in broken lines and a subsequent end portion in solid lines, represents a straight line along which the inlet and outlet pressures would be equal. Line II running from O to A is shown in solid line and represents the application of relatively low inlet pressures, the inlet pressure P1 being the predetermined pressure at which piston 20 is first movable off its closing position against passage 17. The solid line III running from A to B illustrates the gradual increase in the ratio between the inlet pressures at 2 and the outlet pressures at 4. The inlet pressure P2 represents the predetermined pressure at which the piston 20 will be held permanently off its position closing passage 17. Thereafter the line B–C indicates that the inlet pressures will equal the outlet pressures through the valve of FIGURE 1. Dotted lines III' and III'' illustrate the result when spring 28 is adjusted in either direction to adjust the inlet pressure at which the second differential piston becomes active.

There is claimed:

1. A valve including a housing, an inlet, an outlet, a differential piston reciprocal in said housing between said inlet and said outlet, said piston having a smaller surface presented to said inlet and a larger surface presented to said outlet, a passage through said piston communicating said inlet and said outlet, and a valve element yieldingly urged toward a position closing said passage.

2. The structure of claim 1 characterized by and including an exhaust outlet and a second valve element movable with said first valve element and yieldingly urged toward a position closing said exhaust outlet.

3. The structure of claim 1 characterized by and including a third surface on said piston, said third surface having an area equal to the difference between said smaller and larger surfaces, a housing passage communicating said inlet with said third surface, and a third valve element yieldingly urged toward a position closing said housing passage.

4. The structure of claim 3 wherein said third valve element constitutes a second differential piston.

5. The structure of claim 3 wherein said third valve element has a smaller surface presented to said inlet and a larger surface in communication with said piston third surface.

6. The structure of claim 3 characterized by and including an equalizing passage through said third valve element and a check valve positioned to permit the flow of fluid pressure from said piston third surface to said inlet through said equalizing passage while precluding said flow in an opposite direction through said equalizing passage.

References Cited

UNITED STATES PATENTS 3,183,042  5/1965  Bueler _____ 137—102

NATHAN L. MINTZ, *Primary Examiner.*